United States Patent [19]

Stockman et al.

[11] Patent Number: 5,058,617
[45] Date of Patent: Oct. 22, 1991

[54] NACELLE INLET FOR AN AIRCRAFT GAS TURBINE ENGINE

[75] Inventors: Norbert O. Stockman, Batavia; David E. Yates, Cincinnati; Timothy S. Crum, Fairfield, all of Ohio

[73] Assignee: General Electric Company, Cincinnati, Ohio

[21] Appl. No.: 557,426

[22] Filed: Jul. 23, 1990

[51] Int. Cl.$^5$ .............................................. B64D 33/02
[52] U.S. Cl. .................... 137/15.1; 244/53 B
[58] Field of Search ............................ 137/15.1, 15.2; 244/53 B, 55; 60/39.31

[56] References Cited

U.S. PATENT DOCUMENTS

| | | | |
|---|---|---|---|
| 3,765,623 | 10/1973 | Donelson et al. | 244/53 B |
| 3,946,830 | 3/1976 | Kutney | 137/15.1 X |
| 4,209,149 | 6/1980 | Morris | 137/15.1 X |
| 4,220,171 | 9/1980 | Ruehr et al. | 137/15.1 |
| 4,722,357 | 2/1988 | Wynosky | 137/15.1 |

OTHER PUBLICATIONS

J. M. Abbott, "Aeroacoustic Performance of a Scoop Inlet", Oct. 3–5, 1977, NASA TM 73725, pp. 1–5, FIGS. 1–12.

J. M. Abbott et al., "Aerodynamic and Directional Acoustic Performance of a Scoop Inlet," Sep. 77, NASA Tech. Paper 1028, pp. 1–26.

J. M. Abbott, "Aerodynamic Performance of Scarf Inlets," Jan. 15–17, 1979, NASA TM 79055, pp. 1–14, FIGS. 1–10.

*Primary Examiner*—Alan Cohan
*Attorney, Agent, or Firm*—Jerome C. Squillaro; John R. Rafter

[57] ABSTRACT

A nacelle inlet for channeling airflow to a gas turbine engine having a longitudinal centerline axis includes an annular forward nacelle having a leading edge defining an inlet face for receiving the freestream airflow. A diffuser is disposed in flow communication with the inlet face, with the diffuser being defined about a droop axis inclined relative to the engine centerline axis. The forward nacelle includes a crown and a keel defining therebetween a scarf axis, with the keel extending axially forwardly of the crown so that the scarf axis forms an acute scarf angle greater than zero relative to a reference line perpendicular to the droop axis.

13 Claims, 3 Drawing Sheets

Fig. 6.
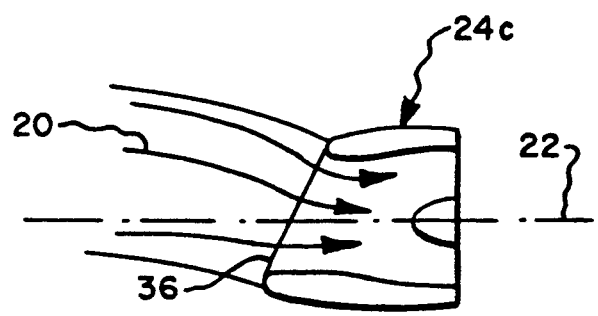
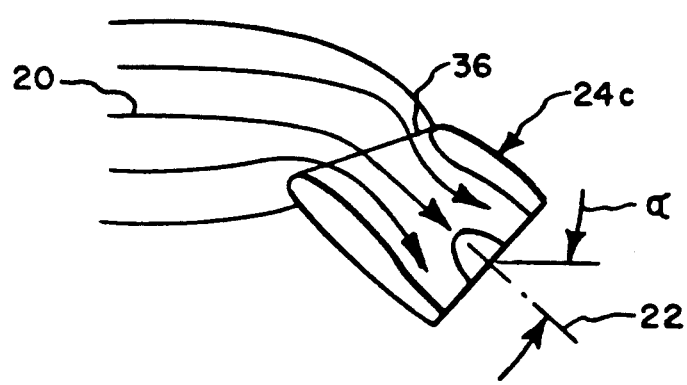
Fig. 7.

NACELLE INLET FOR AN AIRCRAFT GAS TURBINE ENGINE

TECHNICAL FIELD

The present invention relates generally to aircraft engine nacelles, and, more specifically, to a nacelle inlet for a wing mounted gas turbine engine for a subsonic aircraft.

BACKGROUND ART

Conventional subsonic transport aircraft typically include wing mounted gas turbine engines. The engines are typically mounted below the wing by using conventional pylons and are surrounded by an annular conventional nacelle for providing an aerodynamically smooth envelope. Since weight in an aircraft is an important consideration, it is desirable that the nacelle be as small as possible and as light as possible for reducing weight and aerodynamic drag due to the flow of freestream airflow thereover and therethrough. Accordingly, the length, diameter, and thickness of the nacelle directly affects both the weight of the nacelle and the drag area of the nacelle.

Furthermore, the nacelle is typically designed for having an internal flow passage which provides freestream airflow to the gas turbine engine with varying degrees of aerodynamic efficiency. Operation of the nacelle is affected by adjacent structures such as the aircraft fuselage and wing, and different design considerations exist for both low speed operation of the aircraft, such as for example during takeoff, and high speed operation of the aircraft, such as cruise, for example.

Typical aerodynamic performance parameters for evaluating low speed operation of the nacelle include total pressure recovery, circumferential pressure distortion, angle of attack capability of the nacelle relative to freestream airflow without flow separation, and crosswind effects acting on the nacelle. At cruise operation of the aircraft, the incidence angle of the freestream airflow relative to the nacelle is an important consideration relative to avoiding excessive drag. Other cruise considerations include sensitivity of drag along the external surface of the nacelle to changes in engine airflow and freestream Mach number.

Furthermore, Government regulations typically limit the amount of acceptable noise which may be directed to the ground by the gas turbine engines during low speed, takeoff operation. Conventional nacelle inlets require acoustic treatment within the nacelle for meeting noise regulations and require relatively thick nacelle lower lips for meeting low speed high angle of attack requirements for obtaining acceptable flow separation margin. Both of these requirements add weight to the nacelle and the relatively thick lower lip also increases drag. Conventional inlets are typically drooped wherein the nacelle diffuser has a centerline droop axis which is inclined relative to the engine centerline axis so that the nacelle inlet face is perpendicular to the freestream airflow at cruise for minimizing installed drag over the nacelle. Such a droop nacelle inlet also enjoys improved low speed high angle of attack performance.

An advanced concept nacelle inlet sometimes referred to as a scarf, or scoop, inlet is one wherein its lower lip extends forward of the upper lip. Known advantages of scarfing include noise reduction, improved foreign object damage resistance, and improved lower lip high angle of attack performance. Known disadvantages of the scarf inlet include reduced pressure recovery and increased pressure distortion at certain low speed conditions, increased drag at cruise, and decreased upper lip flow separation margin at low angle of attack as scarf angle increases.

OBJECTS OF THE INVENTION

Accordingly, it is one object of the present invention to provide a new and improved nacelle inlet for a gas turbine engine for a subsonic aircraft.

Another object of the present invention is to provide a nacelle inlet having improved aerodynamic performance at both low speed and cruise operation of an aircraft.

Another object of the present invention is to provide a nacelle inlet having reduced aerodynamic and acoustic disadvantages.

DISCLOSURE OF INVENTION

A nacelle inlet for channeling freestream airflow to a gas turbine engine having a longitudinal centerline axis includes an annular forward nacelle having a leading edge defining an inlet face for receiving the freestream airflow. A diffuser is disposed in flow communication with the inlet face for channeling the airflow to the gas turbine engine, with the diffuser being defined about a droop axis inclined relative to the engine centerline axis. The forward nacelle includes a crown and a keel defining therebetween a scarf axis, with the keel extending axially forwardly of the crown so that the scarf axis forms an acute scarf angle greater than zero relative to a reference line perpendicular to the droop axis.

BRIEF DESCRIPTION OF DRAWINGS

The novel features believed characteristic of the invention are set forth and differentiated in the claims. The invention, in accordance with preferred and exemplary embodiments, together with further objects and advantages thereof, is more particularly described in the following detailed description taken in conjunction with the accompanying drawings in which:

FIG. 6 is a schematic, longitudinal sectional view of a nacelle inlet in accordance with the present invention illustrating inlet freestream airflow streamlines at a zero angle of attack.

FIG. 7 is a schematic, longitudinal sectional view of a nacelle inlet in accordance with the present invention illustrating freestream airflow streamlines at a relatively high angle of attack.

MODE(S) FOR CARRYING OUT THE INVENTION

Figure 1:
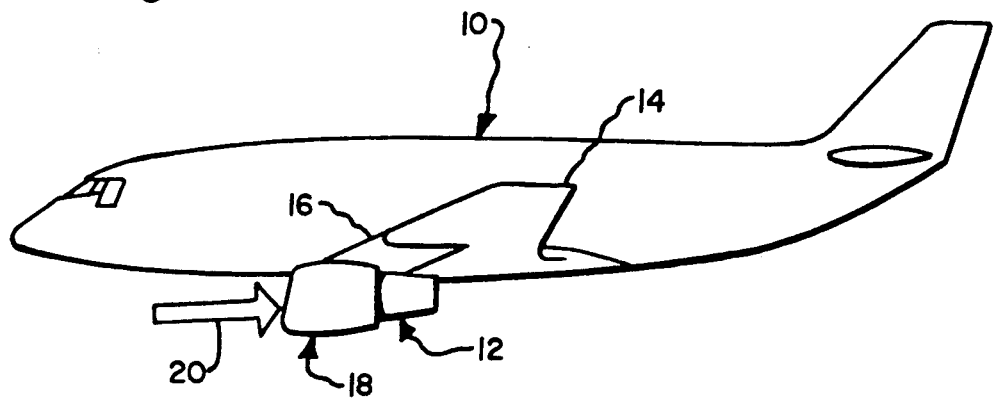
FIG. 1 is a schematic representation of an exemplary subsonic transport aircraft having wing mounted gas turbine engines including a nacelle inlet in accordance with one embodiment of the present invention.

Illustrated in FIG. 1 is an exemplary subsonic commercial transport aircraft 10 having two conventional turbofan engines 12 (only one of which is shown) mounted to respective wings 14 by conventional pylons 16. Surrounding each of the engines 12 is a nacelle 18 in accordance with one embodiment of the present invention. The nacelle 18 is an aerodynamic structure which surrounds the engine 12 and channels freestream airflow 20 into the engine 12 for combustion and generation of thrust in conventional manners.

Figure 2:
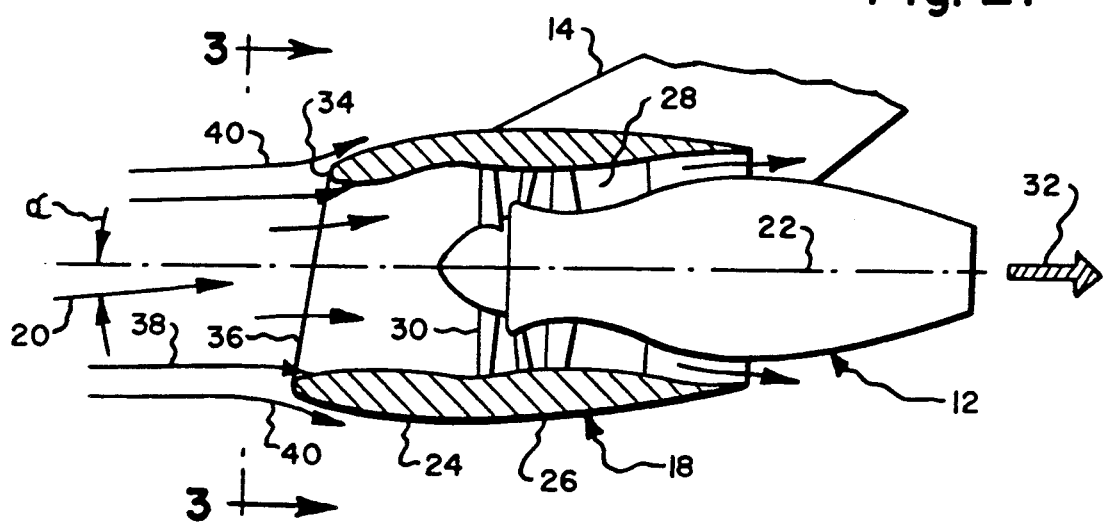
FIG. 2 is a longitudinal sectional view of one of the nacelles and engines mounted to the wing of the aircraft illustrated in FIG. 1.

Illustrated in FIG. 2 is a vertical centerline sectional view of the nacelle 18 and engine 12 illustrated in FIG. 1. The engine 12 includes a conventional longitudinal centerline axis 22 which, during cruise operation of the aircraft 10 as illustrated in FIGS. 1 and 2, is disposed at an acute angle of attack A relative to the incidence angle of the freestream airflow 20 relative thereto. The nacelle 18 includes a generally annular forward nacelle, or inlet, 24, and a conventional annular aft nacelle 26. The aft nacelle 26 is spaced from the engine 12 to define a conventional bypass duct 28 and extends downstream from a conventional fan 30 of the engine 12.

During conventional operation, the engine 12 powers the fan 30 which bypasses a portion of the airflow 20 through the bypass duct 28 for generating thrust for powering the aircraft 10. A portion of the airflow 20 is conventionally channeled through the engine 12 where it is mixed with fuel and undergoes combustion for generating combustion gases 32 which are discharged from the engine !2 after powering, among other things, the fan 30.

The forward nacelle 24 in accordance with an exemplary embodiment of the present invention includes an annular leading edge, or highlight, 34 which defines an upstream facing generally annular inlet face 36 which receives the airflow 20 for channeling to the fan 30. The airflow 20 which enters the inlet face 36 is also referred to as the capture streamtube 38 which enters the forward nacelle 24 through the inlet face 36. Spillage airflow 40 is that portion of the freestream airflow 20 surrounding the capture streamtube 38 which is deflected around the forward nacelle 24 and therefore does not enter the inlet face 36.

Figure 3:
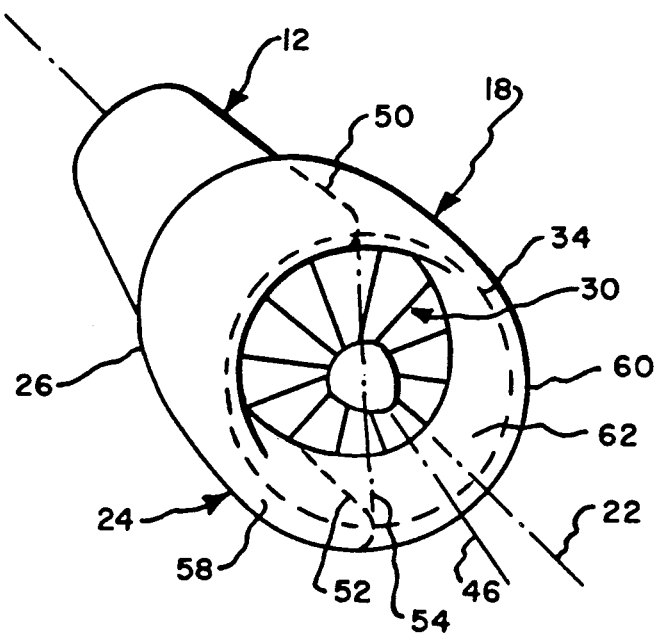
FIG. 3 is a downstream facing, perspective view of the nacelle illustrated in FIG. 2 taken along line 3—3.
Figure 4:
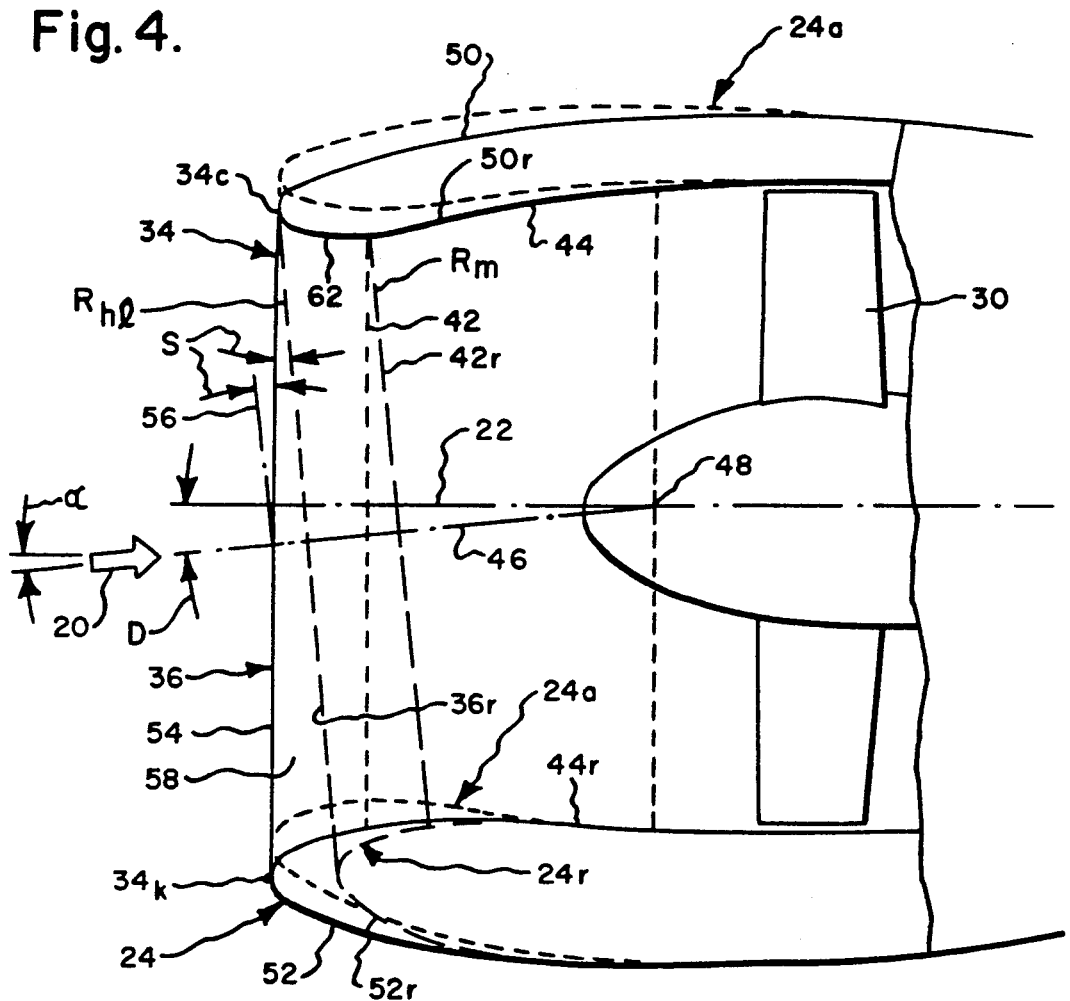
FIG. 4 is a schematic, longitudinal sectional view of the nacelle inlet illustrated in FIGS. 1-3 shown in more particularity.

The forward nacelle 24 is illustrated in more particularity in FIGS. 3 and 4 and includes a throat 42 of minimum flow area disposed downstream from the leading edge 34, and an annular diffuser 44 extending downstream from the throat 42 to the fan 30. The throat 4 is conventionally sized for channeling a predetermined mass flow rate of the airflow 20 through the fan 30. The diffuser 44 is disposed in flow communication with the inlet face 36, the throat 42 and the engine 12, and is sized and configured for reducing velocity of the airflow 20 while increasing its static pressure as is conventionally known.

In one manner of designing the forward nacelle 24, the forward nacelle 24 is initially conventionally sized and configured about the engine longitudinal centerline axis 22, as shown in dashed line in FIG. 4 as undrooped forward nacelle 24a, with its throat having a predetermined amount of flow area. The nacelle 24a is typically symmetrical about a vertical plane through the centerline axis 22. The forward nacelle 24a is then conventionally drooped in a downward direction relative to the engine centerline axis 22 to establish a reference droop forward nacelle, or baseline inlet 24r. The baseline inlet 24r includes a reference inlet face 36r disposed perpendicular to the freestream airflow 20 at cruise operation of the aircraft 10, and a reference diffuser 44r. The reference inlet face 36r is so drooped by conventionally drooping the diffuser 44r so that the diffuser centerline, or droop axis 46 is inclined at an acute droop angle D greater than zero relative to the engine centerline axis 22 about a pivot point 48 disposed downstream of the throat 42. The droop axis 46 typically represents a centerline of the diffuser 44 and is typically straight, although other embodiments having a curved droop axis, for example, may also be used. The forward nacelle 24 is conventionally drooped so that the reference inlet face 36r is disposed perpendicular to the freestream airflow 20 at cruise operation for minimizing drag over the forward nacelle 24 at cruise, for example.

However, and in accordance with the present invention, the inlet face 36 of the forward nacelle 24 is disposed not perpendicularly relative to the freestream airflow 20 at cruise as is the reference inlet face 36r but at an acute angle relative thereto. More specifically, the forward nacelle 24 as illustrated in FIG. 4, for example, includes a radially upper crown 50 and a radially lower keel 52 which are longitudinal sections of the forward nacelle 24 along a vertical plane extending through the engine centerline axis 22. Both the crown 50 and the keel 52 include respective portions of the leading edge 34 designated 34c and 34k, respectively. The keel leading edge portion 34k and the crown leading portion 34c define a straight scarf axis 54 extending therebetween, and the keel leading edge portion 34k extends axially parallel to the droop axis 46 forward of the crown leading edge portion 34c so that the scarf axis 54 forms an acute scarf angle S greater than zero relative to a reference line 56 disposed perpendicular to the droop axis 46 at the inlet face 36. Alternatively, the scarf angle S is the acute angle between the scarf axis 54 and the reference inlet face 36r relative to the crown leading edge portion 34c. Accordingly, the forward nacelle 24 in accordance with the present invention including scarfing and drooping as herein described, results in a nacelle referred to as a "scroop nacelle inlet" wherein the inlet face 36 is no longer positioned perpendicular to the droop axis 46 or to the freestream airflow 20 at cruise.

In the exemplary embodiment of the invention illustrated in FIG. 4, the annular leading edge 34 and the inlet face 36 are planar and are obtained by displacing the keel leading edge portion 34k axially parallel to the droop axis upstream of the reference inlet face 36r of a reference keel 52r with a linear transition of decreasing axial displacement from the keel leading edge portion 34k to the crown leading edge portion 34c. The baseline inlet 24r also includes a reference throat 42r and a reference crown 50r, and in this embodiment of the invention the scroop crown 50 is substantially the same as the reference crown 50r and both are disposed at a common axial position. The scroop keel 52 may simply be an extension of the reference keel 52r parallel to the droop axis 46 with the scroop throat 42 being at least as large as the reference throat 42r. The location of the scroop throat 42 may be conventionally determined and may even be the same as the reference throat 42r. The scroop diffuser 44 may also be the same as the reference diffuser 44r, or may be slightly longer, for example, to accommodate the longer scroop keel 52.

In the exemplary embodiment illustrated in FIG. 4 wherein the droop axis 46 is straight, the scarf angle S is at least as large as the droop angle D. For example, with a droop angle D of about 5°, and a scarf angle S of about 5°, the effect of drooping the reference inlet face 36r is apparently canceled by the scarfing of the inlet face 36r since the effect of the scarf angle S and the droop angle D are opposite to each other. More specifically, in the embodiment illustrated in FIG. 4, drooping of the inlet reference face 36r inclines the reference face 36r relative to the crown leading edge portion 34c in a counter clockwise direction, whereas scarfing of the inlet face 36r inclines the inlet face 36r in a clockwise direction relative to the crown leading portion 34c with the resultant inlet face 36 being disposed perpendicularly to the engine centerline axis 22, and therefore at the acute angle A relative to the freestream airflow 20 at cruise.

Although the inlet face 36 is no longer positioned perpendicular to the droop axis 46 or the freestream airflow 20 at cruise, the inlet 24 remains drooped about the centerline axis 22 resulting in certain advantages of the scroop nacelle inlet. For example, tests indicate that drag over the forward nacelle 24 due to the spillage airflow 40, as shown in FIG. 2, is reduced at the keel 52 due to the combination of drooping and scarfing as compared to the baseline unscarfed-drooped inlet 24r alone. It appears that scarfing shifts some spillage from the keel 52 to the crown 50, whereas drooping appears to do the opposite, with the combination thereof having a cooperative effect resulting in overall improvement of keel spillage drag.

Figure 5:
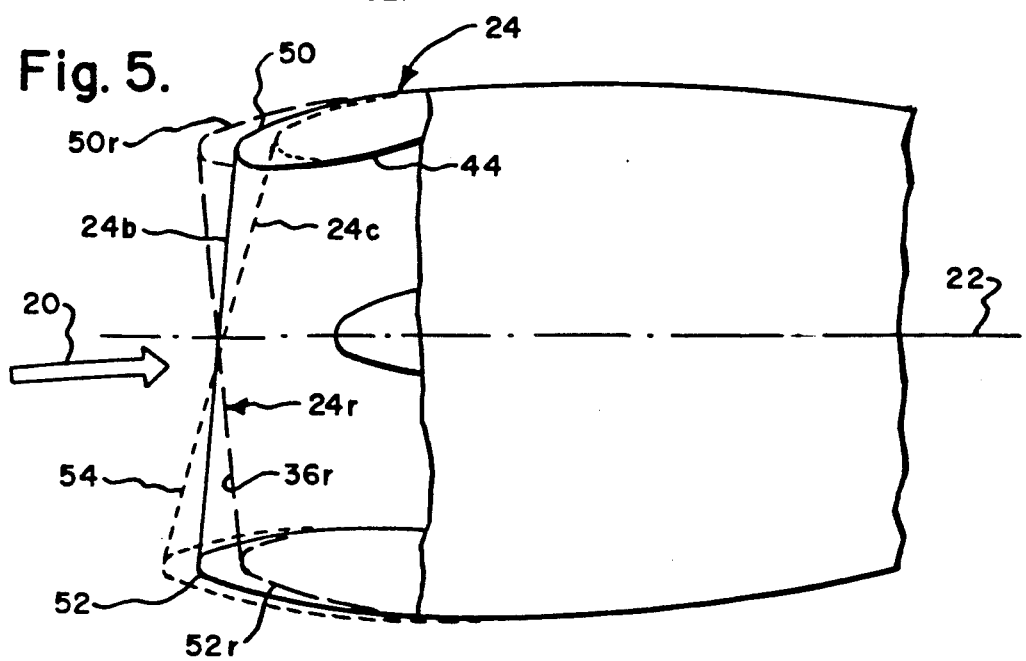
FIG. 5 is a schematic, longitudinal section view of a nacelle illustrating two additional embodiments of the present invention along with a baseline nacelle inlet.

Illustrated in FIG. 5 is a longitudinal sectional view of the forward nacelle 24 illustrating two additional embodiments of a scroop inlet. More specifically, illustrated in bold dash line is the baseline nacelle inlet 24r having 5° of droop associated with the reference inlet face 36r which is inclined 5° downward relative to the engine centerline axis 22. In a preferred embodiment of the present invention, wherein the baseline inlet 24r is an existing design sized and configured for a particular, predetermined, engine and aircraft application, it is preferred to keep as much of the baseline inlet 24r geometry as possible in order to minimize changes and to reduce the addition of dimensions or weight. Accordingly, the droop baseline inlet 24r may be scarfed by translating aft the crown 50 and translating forward the keel 52 for scarfing the inlet face 36r parallel to the droop axis 46.

More specifically, a second exemplary embodiment of a scroop nacelle inlet 24b includes a scarf angle S of about 10° in addition to the droop angle D of about 5°, with the combination also being referred to as a 10°×5° scroop inlet. The 10°×5° scroop inlet 24b may be formed by providing the scarf angle S first and then providing the droop angle D, or vice versa. In this embodiment where the crown 50 is disposed axially rearwardly of the reference crown 50r, such translation aft is limited by the amount of acceptable diffusion which may be obtained in the diffuser 44 with such a shortened crown 50. The keel 52 is disposed forwardly of the reference keel 52r for establishing the scarf axis 54 with the translated crown 50. The remainder of the scroop inlet 24b is conventionally designed for obtaining aerodynamically smooth transitions between the respective elements of the nacelle.

Similarly, a third exemplary embodiment of the scoop nacelle inlet 24, which is designated 24c, includes a scarf angle S of about 20° and a droop angle D of 5° for obtaining a 20°×5° scroop inlet 24c. The 20°×5° scroop inlet 24c is obtained similarly to the second embodiment by utilizing the scarf angle S of 20° instead of 10°.

Referring again to FIG. 3, the forward nacelle inlet 24 further includes first and second transversely spaced apart sides 58 and 60, respectively, extending circumferentially oppositely from the keel 52 to the crown 50 and radially outwardly from the droop axis 46. The first and second sides 58 and 60 include respective portions of the leading edge 34. Referring additionally to FIG. 4, a radially inwardly facing annular lip 62 extends from the leading edge 34 to the diffuser 44 at generally the throat 42. The lip 62 has a conventionally defined highlight radius $R_{hl}$ measured between the droop axis 46 and the leading edge 34 and a conventionally defined minimum radius $R_m$ relative to the droop axis 46, which in this embodiment occurs at the throat 42, but may occur adjacent thereto depending upon particular design applications as conventionally obtained. These radii define a conventionally defined contraction ratio $R_{hl}/R_m$. The contraction ratio varies circumferentially along at least a portion of the leading edge 34. For example, the crown 50 in the embodiment illustrated in FIG. 4 is thinner than the keel 52 and the contraction ratio associated with the lip 62 at the crown 50 is different than that associated with the keel 52.

In a preferred embodiment of the invention, the contraction ratio at the keel 52 is inversely proportional to the scarf angle S so that the lip 62 at the keel 52 is radially thinner than the reference keel 52r of the baseline inlet 24r having a scarf angle S of zero value. The significance of this feature of the present invention may be obtained from examination of FIGS. 6 and 7.

More specifically, FIG. 6 illustrates schematically the 20°×5° scroop nacelle inlet 24c disposed at an angle of attack A of 0° relative to the freestream airflow 20. In this embodiment, the inlet face 36 is disposed at 15° relative to the engine centerline axis 22 which is obtained by subtracting the droop angle D of 5° from the scarf angle S of 20°. Accordingly, the inlet face 36 is inclined forwardly and upwardly relative to the freestream airflow 20. FIG. 7 illustrates the 20°×5° nacelle inlet 24c disposed at a relatively high angle of attack A of about 50° relative to the freestream airflow 20. Tests indicate that the scroop nacelle inlet 24c enjoys relatively higher angle of attack A capability as compared to the baseline nacelle inlet 24r, without experiencing undesirable flow separation at the lip 62 at the keel 52.

The above described advantage of the present invention allows for the relative thickness of the keel 52, including the lip 62 at the keel 52 to be correspondingly reduced directly proportional to the amount of the scarf angle S as a tradeoff against the higher angle of attack A capability of the scroop nacelle inlet 24. The baseline nacelle inlet 24r, without scarfing, requires a relatively thick keel 52r for providing acceptable flow separation margin at the relatively high angles of attack A experienced in operation. A thinner keel 52 and keel lip 62 reduce both weight and surface area over which the freestream airflow 20 flows, thus reducing drag thereover.

FIG. 4 illustrates an exemplary embodiment of preferred side, or longitudinal sectional profiles of the leading edges 34 of the first and second sides 58 and 60. In the FIG. 4 embodiment, the inlet face 36 is planar and the leading edge 34 is straight from the keel 52 to the crown 50. The embodiment of the first and second sides 58 and 60 illustrated in FIG. 4 may be varied depending on particular design applications and performance tradeoffs including, for example, crosswind effects acting on the scroop nacelle 24 during operation in flight of the aircraft 10.

Additional advantages of the scroop inlet 24 in accordance with the present invention as indicated by testing include an improvement in angle of attack capability of the nacelle 24 at low speed as a direct function of increasing scarf angle S, such as during takeoff, with improved flow separation margin of the keel 52 over a range of decreasing velocities of the freestream airflow 20, and over a range of increasing mass flow rates of the airflow 20 through the diffuser 44.

Additional advantages of the scroop inlet 24 further include good low speed aerodynamic performance, in particular over the keel 52. The increased angle of attack capability of the scroop inlet 24 allows for either higher angle of attack of the aircraft 10, for example for V/STOL type aircraft, or for more conventional angle of attack requirements of conventional aircraft, the thickness of the keel 52 may be correspondingly reduced thusly reducing weight and drag area of the scroop nacelle inlet 24. The tradeoff between the thickness of the keel 52, including the lip 62, and the scarf angle S can be optimized for particular applications.

Tests indicate that the scroop inlet 24 will also result in reduction of fan generated noise directed toward the ground as compared to a conventional drooped inlet, such as the drooped baseline inlet 24r. The extended keel 52 of the scroop inlet 24 is effective for deflecting the fan noise generally upwardly away from the ground and therefore results in a reduced requirement for acoustic treatment of the nacelle 24 which also can reduce nacelle weight and possibly nacelle length.

Furthermore, the scroop inlet 24 appears to be also effective for reducing ingestion of ground debris leading to reduced foreign object damage and improved erosion control during taxiing and takeoff operation of the aircraft 10.

Yet further, the scroop inlet 24 provides improved high speed spillage drag performance over the sides 58 and 60.

However, testing also indicates that the scroop nacelle inlet 24 results in higher values of spillage drag over the crown 50 at high speed operation, e.g. at cruise, as a direct function of increasing scarf angle S over a range of increasing velocities of the freestream airflow 20, and over a range of decreasing mass flow rates through the diffuser 44. Although drag increases directly proportional to the value of the scarf angle S, the amount of drag penalty decreases with increasing values of mass flow rate, and at the design point associated with cruise operation of the scroop nacelle 24 and the aircraft 10, the drag penalty is relatively small and acceptable when evaluated as a tradeoff criterion in the design of the nacelle 24.

Since scarfing of the baseline droop inlet 24r directly affects aerodynamic performance of the crown 50, the crown 50 may be preferably configured for reducing total pressure circumferential distortion and spillage drag, for example, as well as providing improved internal total pressure recovery for particular applications of the scroop inlet 24. This may be accomplished by conventional iterative design and testing for particular design applications.

Although the preferred scroop inlet 24 is preferably sized and configured relative to the baseline droop inlet 24r for a particular application, the droop inlet 24 may also be configured for optimizing aerodynamic and acoustic performance around the circumference of the inlet. For example, the size and configuration of the various elements of the scroop inlet 24 including the crown 50, keel 52, first and second sides 58 and 60, scarf angle S, droop angle D, and contraction ratio of the lip 62 may be varied in accordance with conventional tradeoff practice and testing for obtaining a resultant scroop inlet 24 having preferred aerodynamic and acoustic performance wherein advantages are increased and disadvantages are reduced. Furthermore, the lip 62, throat 42, and diffuser 44 may also be conventionally sized and configured for obtaining acceptable structural transitions and good overall performance of the scroop inlet 24.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

For example, the invention may be practiced on all types of nacelle inlets including those that are not symmetrical about a vertical plane extending through the engine centerline axis 22 or the droop axis 46.

Accordingly, what is desired to be secured by Letters Patent of the United States is the invention as defined and differentiated in the following claims:

1. A scroop nacelle inlet for channeling freestream airflow to a gas turbine engine having a longitudinal centerline axis comprising:
   an annular forward nacelle having a leading edge defining an inlet face for receiving said airflow and a diffuser disposed in flow communication with said inlet face, said diffuser being defined about a droop axis inclined relative to said engine centerline axis; and
   said forward nacelle having a radially upper crown including a portion of said leading edge and a radially lower keel including a portion of said leading edge, said keel leading edge portion and said crown leading edge portion defining therebetween a scarf axis, said keel leading edge portion extending axially forward of said crown leading edge portion so that said scarf axis forms an acute scarf angle greater than zero relative to a reference line perpendicular to said droop axis.

2. An inlet according to claim 1 wherein said droop axis is straight and is inclined at an acute droop angle greater than zero relative to said engine centerline axis.

3. An inlet according to claim 2 wherein said scarf angle is at least as large as said droop angle.

4. An inlet according to claim 3 wherein said scarf angle is about 5° and said droop angle is about 5°.

5. An inlet according to claim 3 wherein said scarf angle is about 10° and said droop angle is about 5°.

6. An inlet according to claim 3 wherein said scarf angle is about 20° and said droop angle is about 5°.

7. An inlet according to claim 1 wherein said inlet face is planar.

8. An inlet according to claim 1 wherein said forward nacelle further includes;
   first and second transversely faced apart sides extending oppositely from said keel to said crown, said sides including portions of said leading edge; and
   a radially inwardly facing annular lip extending from said leading edge to said diffuser for channeling said airflow to said diffuser, said lip having a highlight radius $R_{hl}$ between said droop axis and said leading edge and a minimum radius $R_m$ relative to said droop axis defining a contraction ratio $R_{hl}/R_m$, said contraction ratio varying circumferentially along at least a portion of said leading edge.

9. An inlet according to claim 8 wherein said side leading edges have an arcuate longitudinal sectional profile from said keel to said crown.

10. An inlet according to claim 8 wherein said contraction ratio at said keel is inversely proportional to said scarf angle so that said keel is radially thinner than a reference keel having a scarf angle of zero value.

11. An inlet according to claim 8 wherein said scroop nacelle inlet is sized and configured relative to a reference droop nacelle inlet sized and configured for a predetermined gas turbine engine, said reference droop nacelle having a reference crown, reference keel and a reference diffuser defined about said droop axis, said scroop keel being disposed forwardly of said reference keel.

12. An inlet according to claim 11 wherein said scroop and reference crowns are disposed at a common axial position.

13. An inlet according to claim 11 wherein said scroop crown is disposed rearwardly of said reference crown.

* * * * *